UNITED STATES PATENT OFFICE.

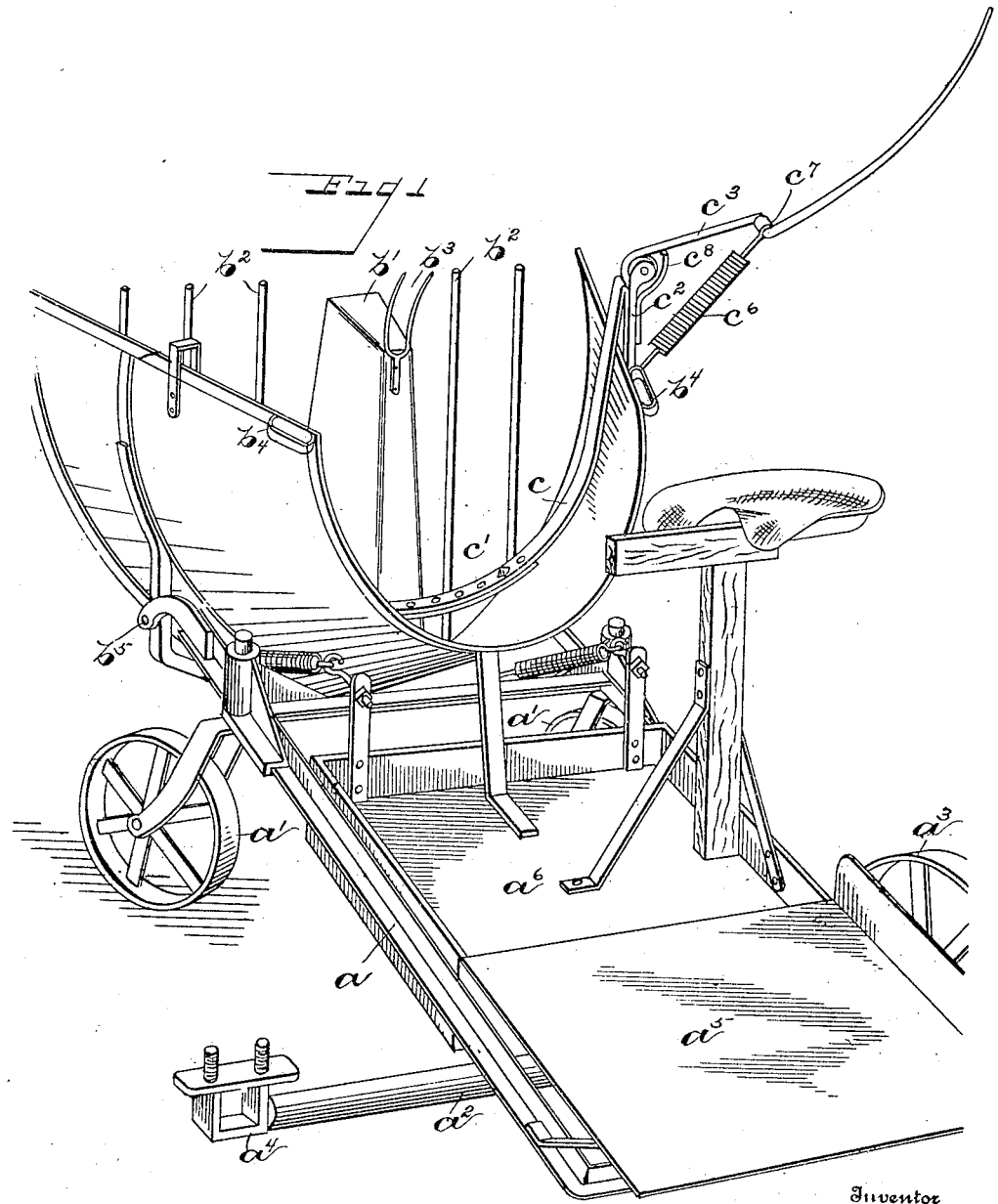

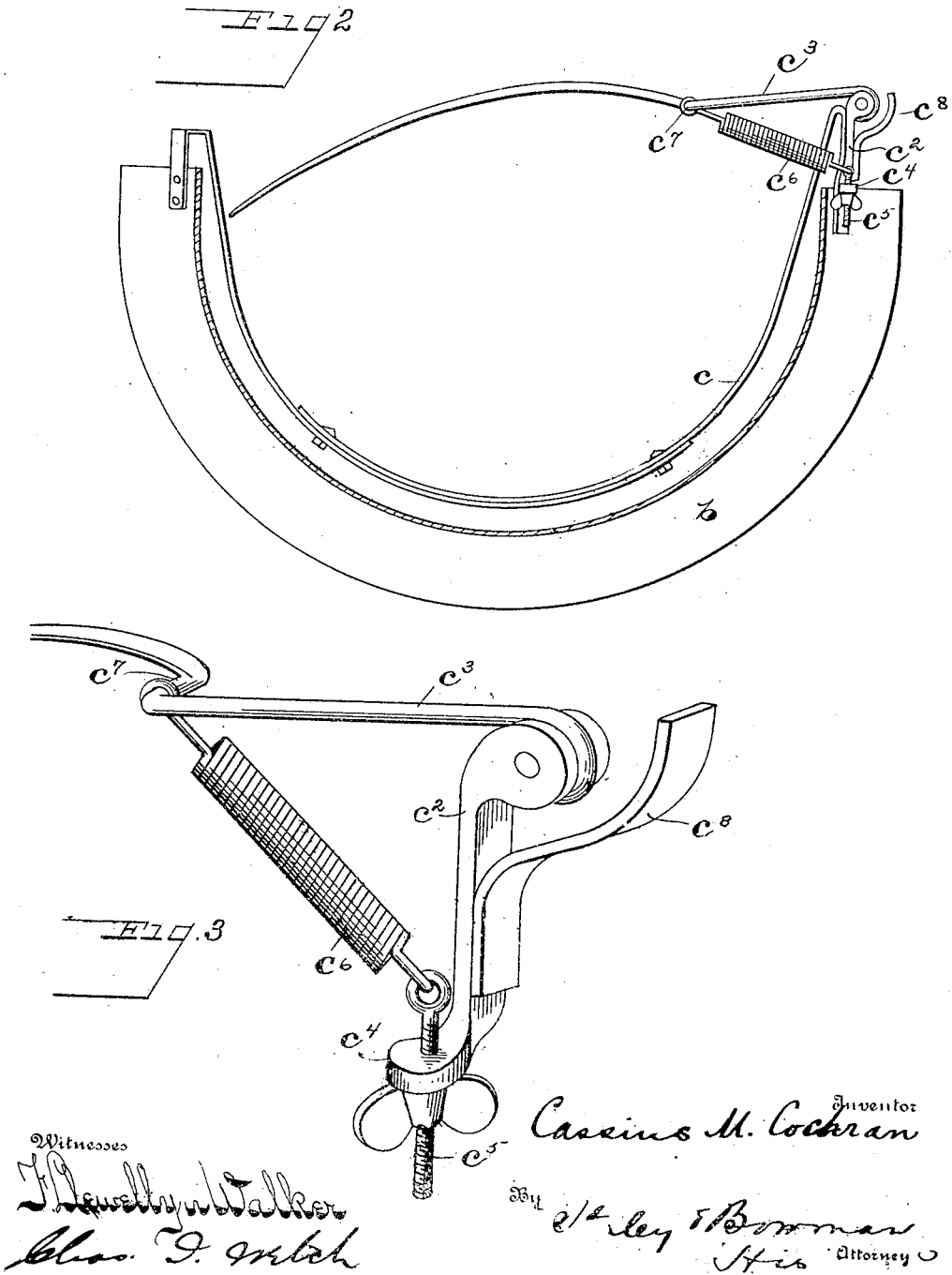

CASSIUS M. COCHRAN, OF EMPORIA, KANSAS, ASSIGNOR TO W. S. THOMAS, OF SPRINGFIELD, OHIO.

GRAIN-SHOCKER.

No. 882,052.   Specification of Letters Patent.   Patented March 17, 1908.

Application filed August 13, 1906. Serial No. 330,305.

*To all whom it may concern:*

Be it known that I, CASSIUS M. COCHRAN, a citizen of the United States, residing at Emporia, in the county of Lyon and State of Kansas, have invented certain new and useful Improvements in Grain-Shockers, of which the following is a specification.

My invention relates to grain shockers adapted for use with harvesters adapted to bind the grain in sheaves.

The shocker is adapted to be connected to the harvester or to be drawn independent of the harvester but in such relation thereto that it will receive the bound sheaves as they are discharged from the machine.

The invention relates particularly to means for compressing the shock after it is formed, and insuring the proper discharge thereof, and for yieldingly holding the shock after it is set upon the ground to prevent it being overthrown by the momentum of the shocking mechanism as the shock is discharged.

The object of the invention is to provide a simple, efficient and comparatively cheap device as described.

With the above primary and other incidental objects in view, as will appear from the specification, the invention consists of the construction, arrangements of parts, or their equivalents, hereinafter described and set forth in the claims.

Referring to the drawings, Figure 1 is a perspective view of the complete shocking mechanism distinguished from the harvester. Figs. 2 and 3 are detail views of the shock compressing mechanism hereinafter described.

Like parts are indicated by similar characters of reference throughout the several views.

Referring to the drawings by letter, the structure consists of a main truck, $a$, mounted upon carrying wheels, the rear wheels, $a^1$, of which are preferably swiveled. The forward part of the truck is provided with an axle, $a^2$, having a carrying wheel, $a^3$, at one end and connecting devices, $a^4$, at the opposite end adapted to be engaged with the frame of the harvester. However, it is obvious that if desired, a second wheel, $a^3$, may be located upon the axle, $a^2$, and the connection with the harvester machine entirely dispensed with. Located at the front portion of the truck, $a$, is a deck, $a^5$, upon which the bound sheaves of grain are discharged from the harvester. Secured in a horizontal position at the rear of the machine is a shock receptacle, $b$, in the form of a half of a truncated cone. The shock receptacle, $b$, is pivoted at $b^5$ to the extremities of the side bars of the truck, $a$. The receptacle, $b$, is provided with a divider, $b^1$, about which the sheaves of grain are arranged, the object of the divider being to give the sheaves the proper inclination near their bases to make the shock self-supporting. Rods or fingers, $b^2$, are provided at one end of the receptacle, $b$, and serve as guides to form a flat bottom to the shock and also to steady the shock while it is being set up.

Intermediate the receptacle, $b$, and the deck, $a^5$, there is provided on the truck, $a$, a box-like platform, $a^6$, wherein the operator stands when delivering the sheaves of grain from the deck, $a^5$, to the receptacle, $b$, and which also serves to collect the loose grains which may be shaken out during the handling of the sheaves. Extending about the interior of the receptacle, $b$, substantially midway between the ends thereof and concentric therewith is a shock former, $c$. The shock former, $c$, is preferably formed in two pieces, as shown in the drawings, each of the pieces having therein a series of holes, $c^1$, through which bolts or other fastening means extend to secure it in the desired relation with the receptacle, $b$.

Extending vertically from one side of the receptacle, $b$, is a bracket, $c^2$, having hinged to the upper extremity thereof a compression arm, $c^3$. The compression arm, $c^3$, is of such length that when in its closed position, as shown in Figs. 2 and 3, it will extend substantially across the receptacle. The bracket, $c^2$, and the connection of the compression arm, $c^3$, and the auxiliary parts are best shown in detail in Fig. 3. The lower portion of the bracket, $c^2$, is formed with the foot, $c^4$, having therein an adjusting screw, $c^5$, with which there engages a helical tension spring, $c^6$, the opposite end of said spring, $c^6$, being engaged in an offset, $c^7$, in the compression arm, $c^3$. There is also attached to the bracket, $c^2$, an arm, $c^8$, adapted to form a stop for the compression arm, $c^3$, and limit its movement in one direction.

The arrangement of the parts is such that when the compression arm, $c^3$, is in its operative position, as shown in Figs. 2 and 3, the spring, $c^6$, tends to pull the compression arm, $c^3$, downward, causing it to exert pressure upon the sheaves within the receptacle, $b$, and hold said sheaves in their adjusted position. However, upon moving the compression arm, $c^3$, about its hinged connection with the bracket, $c^2$, until the arm, $c^3$, passes the center, the spring, $c^6$, will exert an influence upon the arm, $c^3$, to hold it in its extended position, as shown in Fig. 1, wherein the arm, $c^3$, rests upon the stop, $c^8$, and is held in position by the tension of the spring, $c^6$. In operation, the receptacle, $b$, lies in a horizontal position, while the shock is being formed, the operator standing on the platform, $a^5$, lifts the bound sheaves from the deck, $a^4$, where they are delivered by the harvester, and arranges them within the receptacle, $b$, with the butts of the sheaves against the rods or fingers, $b^2$, and the heads toward the operator. The shape of the receptacle, $b$, is such that the shock will be formed somewhat tapering and the divider, $b^1$, serves to further spread the base of the shock in order that it may be self-sustaining when placed upon the ground. The last shock placed within the receptacle is engaged by the tines of the fork, $b^3$, secured to the divider, $b^1$, thereby assisting in holding the sheaves in proper relation while the shock is being set up. After sufficient sheaves have been placed in the receptacle, the operator will by hand pull the compression arm, $c^3$, from the position shown in Fig. 1 to the position shown in Fig. 2, when it will exert some pressure upon the shock to retain it in compact form while the shock is being elevated to vertical position, which is done by the operator grasping the handles, $b^4$, and turning the receptacle upward about its pivotal connection, $b^5$, with the main truck, $a$.

When the shock is set in its upright position, the arm, $c^3$, will extend behind the shock and acts to prop said shock and prevent it from being upset through the momentum of the receptacle, $b$, as it is turned upon its pivotal connection to the upright position. As the truck, $a$, moves forward, the receptacle, $b$, will be drawn away from the shock, the divider, $b^1$, and the fingers, $b^2$, being readily withdrawn therefrom. The arm, $c^3$, which extends behind the shock, will, as the truck moves forward, be gradually turned outward until the arm is intermediate of its forward and backward position and substantially on the center. At this point, the arm will remain on the center, holding the sides of the shock compressed and preventing the sheaves at the side from falling outward. As the truck moves onward and the end of the arm passes the shock, the arm will be thrown sufficiently to pass the center, and the spring will then hold the arm in its extreme outward position. The operator by grasping the handles, $b^4$, will again turn the receptacle to a horizontal position and the formation of the next shock will be continued as hereinbefore described.

It will thus be seen from the above description that there has been produced a grain shocker possessing the various features of advantage hereinbefore enumerated as desirable, and which obviously is susceptible of modification in its form, proportion, design and arrangement of parts, without departing from the principle involved or sacrificing any of its advantages.

Having thus described my invention, I claim:

1. In a shocker, the combination of a receptacle for a shock of bundles, capable of tilting from horizontal to vertical position, with means comprising a pivoted arm connected with said receptacle to prevent the over-turning of said bundles by said tilting movement, substantially as specified.

2. In a shocker, the combination of an open-sided receptacle for a shock of bundles capable of tilting from horizontal to vertical position, an arm normally extending across the open side of said receptacle, and means connected with said arm for causing said arm to prop the bundles during their discharging movement and as the machine moves forward.

3. In a shocker, the combination of a receptacle for a shock of bundles, and supports therefor, an oscillating compressing arm connected to the receptacle, and means connected with said arm for causing the arm to uphold the shock after same is discharged from the receptacle as the machine moves forward.

4. In a shocker, the combination of a receptacle for the shock, the rear edge of said shock being located below the front edge, said receptacle being capable of a tilting movement, with an oscillating compressing device located upon said receptacle, a non-yielding supporting band within the receptacle located in substantial parallelism with the front edge of said receptacle and intermediate its front and rear edges, for the purpose specified.

5. In a shocker, the combination of a receptacle for the shock capable of tilting from horizontal to vertical position, a movable compressor arm, means for normally holding the arm against the shock at the beginning of the tilting movement of the receptacle and for causing the arm to uphold the bundles after said shock is tilted to vertical position by said receptacle and as the machine moves forward, for the purpose specified.

6. In a shocker, the combination with a receptacle for the shock capable of tilting movement, an arm normally bearing against the shock pivoted at one end to the receptacle, and thrown to a partly open position by the discharge movement of the shock, and means connected with said arm to uphold the bundles while the arm is in its intermediate position and for throwing the arm to its completely open position after the end of the arm passes the shock, substantially as specified.

7. In a shocker, the combination of a frame with a receptacle for the shock, a compressor arm pivoted to the receptacle, spring-pressed holding means connected with the arm, movable connecting devices between the holding means and the frame, said holding means causing the arm to uphold the bundles when tilted to vertical position, substantially as specified.

8. In a shocker, the combination of a frame with a receptacle for the shock, capable of tilting movement, of a curved pivoted compressor arm, means for normally holding its free end to one side of a vertical plane passing through the longitudinal axis of the shock and against the shock while the shock is held by the receptacle, and for holding the free end of said arm substantially in said plane during the discharge movement thereof and to the opposite side of the plane after the discharge movement.

9. In a shocker, the combination of a movable receptacle for holding bundles of grain and capable of tilting rearwardly from a horizontal to a vertical position, a compressor arm connected therewith, and means connected with the compressor arm for forcing said bundles forwardly and thereby resisting the rearward movement of said shock, for the purpose specified.

10. In a shocker, the combination of a receptacle for the shock of bundles, a shock former located within the receptacle, and means for adjusting said shock former, an oscillating arm coöperating with the shock former and connected to the receptacle, and means connected with said arm for causing the arm to uphold the shock after same is discharged from the receptacle and as the machine moves forward, substantially as specified.

In testimony whereof, I have hereunto set my hand this 28th day of July A. D. 1906.

CASSIUS M. COCHRAN.

Witnesses:
   H. H. BEAN,
   C. E. THOMAS.